(12) United States Patent
Hightower

(10) Patent No.: US 8,764,531 B2
(45) Date of Patent: Jul. 1, 2014

(54) SYSTEM AND METHOD OF VEHICLE COMPETITION WITH ENHANCED GHOSTING FEATURES

(75) Inventor: Aaron Hightower, Hayward, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 654 days.

(21) Appl. No.: 12/476,198

(22) Filed: Jun. 1, 2009

(65) Prior Publication Data

US 2010/0113115 A1 May 6, 2010

Related U.S. Application Data

(63) Continuation of application No. 10/837,230, filed on Apr. 30, 2004, now abandoned, which is a continuation of application No. 10/156,317, filed on May 23, 2002, now Pat. No. 6,755,654, which is a continuation of application No. 09/615,665, filed on Jul. 14, 2000, now Pat. No. 6,488,505.

(60) Provisional application No. 60/144,272, filed on Jul. 15, 1999.

(51) Int. Cl.
*A63F 9/14* (2006.01)
*A63F 13/00* (2014.01)
*G09B 9/05* (2006.01)

(52) U.S. Cl.
USPC ......... 463/6; 463/23; 434/62; 434/64; 434/69

(58) Field of Classification Search
USPC .......................................... 434/69
See application file for complete search history.

(56) References Cited

U.S. PATENT DOCUMENTS

| 5,453,928 | A | * | 9/1995 | Kaminkow et al. | 463/25 |
| 5,577,913 | A | * | 11/1996 | Moncrief et al. | 434/69 |
| 5,970,143 | A | * | 10/1999 | Schneier et al. | 463/29 |
| 6,287,201 | B1 | * | 9/2001 | Hightower | 463/41 |
| 6,416,412 | B1 | * | 7/2002 | Hightower et al. | 463/41 |
| 7,985,128 | B2 | * | 7/2011 | Fong | 463/16 |
| 2011/0014969 | A1 | * | 1/2011 | Nicely | 463/16 |

* cited by examiner

*Primary Examiner* — Nikolai A Gishnock
(74) *Attorney, Agent, or Firm* — Jonathan Jaech; Novak Druce Connolly Bove + Quigg LLP

(57) ABSTRACT

A system and method for computerized competition useful for rewarding a player. The system and method may be utilized in arcade games, personal computer games, dedicated video games, networked games, and simulators. The method may include selecting a target reward level or threshold such as by selecting a score from a list of past scores, and dynamically adjusting the reward level according to the ability of the players of the system. The method may further include adjusting the playback of a previous competition sequence according to the adjusted reward level. In one embodiment, a previous vehicle race sequence is stored and played back as a ghost or phantom vehicle simultaneously with a present vehicle of a player.

20 Claims, 11 Drawing Sheets

SYSTEM AND METHOD OF VEHICLE COMPETITION WITH ENHANCED GHOSTING FEATURES

RELATED APPLICATIONS

This application is a continuation of U.S. patent application Ser. No. 10/837,230, filed on Apr. 30, 2004, which is a continuation of U.S. patent application Ser. No. 10/156,317, filed on May 23, 2002, now U.S. Pat. No. 6,755,654, issued Jun. 29, 2004, which is a continuation of U.S. patent application Ser. No. 09/615,665, filed on Jul. 14, 2000, now U.S. Pat. No. 6,488,505, issued Dec. 3, 2002, which claims the benefit of the filing date of U.S. Patent Application No. 60/144,272, entitled "SYSTEM AND METHOD OF VEHICLE COMPETITION WITH ENHANCED GHOSTING FEATURES," filed on Jul. 15, 1999, each of which is hereby incorporated herein by reference in its entirety.

BACKGROUND OF THE INVENTION

1. Field of the Invention

Aspects of the present invention generally relate to vehicle simulators. More particularly, embodiments of the present invention relate to selectively rewarding the user of the simulator.

2. Description of the Related Technology

What is needed is a way to selectively reward users of a simulator or game, such as a vehicle simulator, according to a target reward level established by an owner or operator of the simulator. The target level would vary according to the ability of the users and would be adjusted dynamically.

SUMMARY OF THE INVENTION

In one embodiment of the invention, there is a computerized competition method, comprising accumulating a plurality of competition scores from multiple competitions in a competition environment, wherein the plurality of competition scores are retained from among the multiple competitions; and selecting one of the competition scores to be a threshold for further competitions, wherein passing the threshold determines an award, and wherein the selecting is based on a predefined percentage of awards.

In another embodiment of the invention, there is a computerized competition method, comprising accumulating a competition score from each one of multiple competitions in a competition environment so as to form a plurality of accumulated competition scores; and selecting one of the competition scores to be a threshold for further competitions, wherein passing the threshold determines an award, and wherein the selecting is based on a predefined percentage of awards.

In yet another embodiment of the invention, there is computerized competition method, comprising accumulating a plurality of competition scores from multiple competitions in a competition environment; and selecting one of the competition scores to be a threshold for further competitions, wherein passing the threshold determines an award, and wherein the selecting is based on a predefined percentage of awards.

In yet another embodiment of the invention, there is a computerized competition system, comprising means for accumulating a plurality of competition scores from multiple competitions in a competition environment; and means for selecting one of the competition scores to be a threshold for further competitions, wherein passing the threshold determines an award, and wherein the means for selecting determines which competition score to select as a function of a predefined percentage of awards.

DETAILED DESCRIPTION OF THE PREFERRED EMBODIMENTS

This present invention incorporates by reference the following U.S. Pat. Nos. 5,269,687, entitled "System and Method for Recursive Driver Training"; 5,354,202, entitled "System and Method for Driver Training with Multiple Driver Completion"; 5,366,376, entitled "Driver Training System and Method with Performance Data Feedback"; 5,577,913, entitled "System and Method for Driver Training with Multiple Driver Competition"; and 5,660,547, entitled "Scenario Development System for Vehicle Simulators".

The following detailed description presents a description of certain specific embodiments of the present invention. However, the present invention may be embodied in a multitude of different ways as defined and covered by the claims. In this description, reference is made to the drawings wherein like parts are designated with like numerals throughout.

One embodiment of the invention is described herein with reference to video game systems in an arcade. However, it will be understood that the invention is applicable to vehicle simulators or game systems of other types as well. For example, the invention may be embodied in home video games, whether played on stand-alone units through game controllers that link to ordinary TV sets or for games that are played on personal computers (PCs). Any of these game units, if provided with suitable hardware and software for accommodating networking operation, could be linked to a global network such as the Internet.

Figure 1:
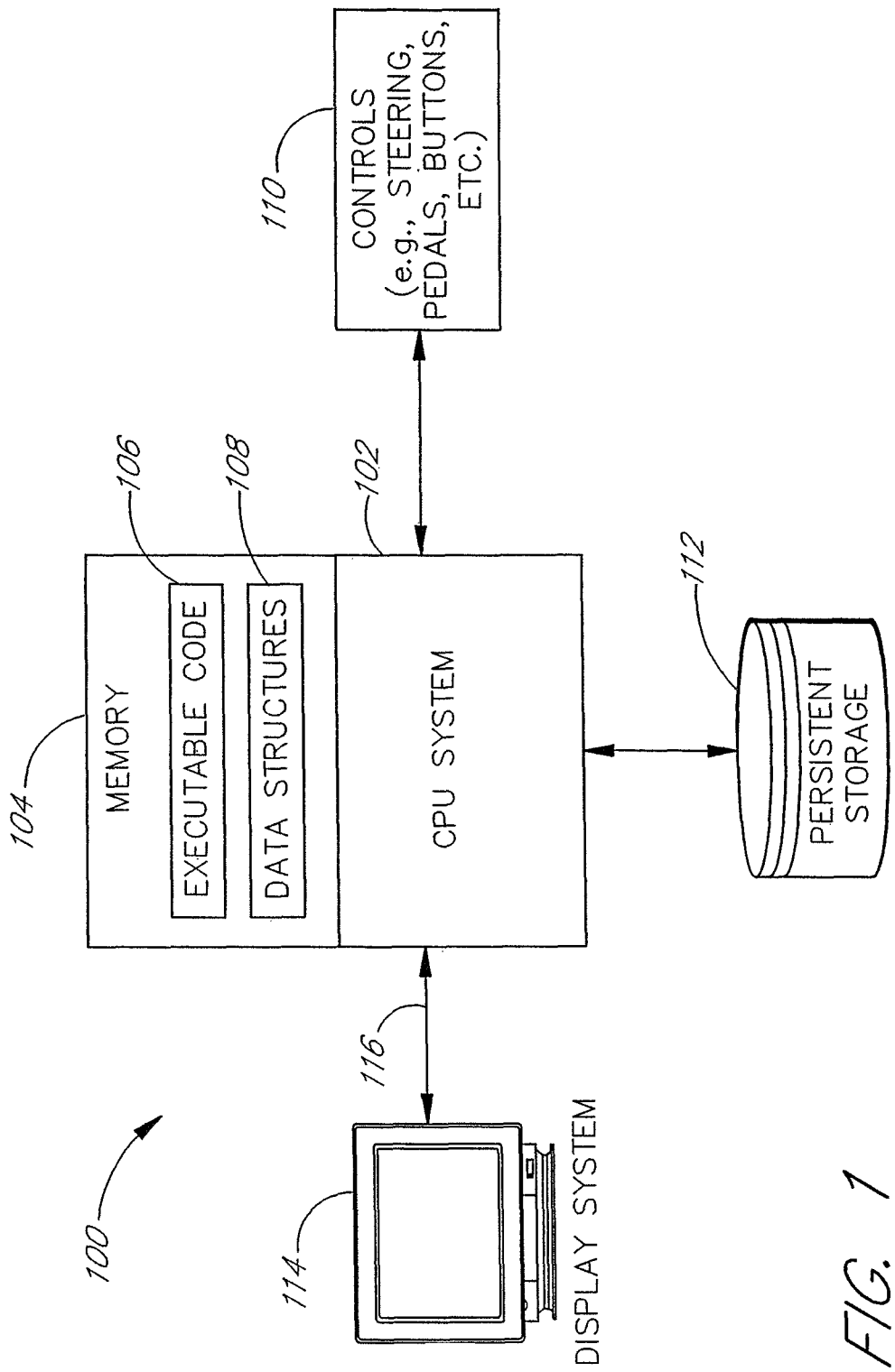
FIG. 1 is a block diagram of one embodiment of the components for a simulated vehicle competition system of the present invention.

FIG. 1 illustrates an example of a game system 100 that includes several subsystems, as is known in the art. For example, an arcade game system may include a display system 114 for displaying high resolution, three dimensional images to a screen. The display system 114 communicates with a Central Processing Unit (CPU) system 102 through a bus 116. The bus 116 can be in the form of any conventional data bus, but in one embodiment, is a peripheral component interconnect (PCI) bus as is well known in the electronics technology. The CPU system 102 may include a processor such as a Quantum Effect Design, Inc. R7000 processor or any other well-known processors, such as those provided by Motorola, Hitachi, Intel or IBM. The CPU system 102 may also include an appropriate computer memory 104, an input/output (I/O) subsystem (not shown), and persistent storage 112 for storing computer programs and data. The memory 104 may include an executable code portion 106 for the vehicle simulation competition and reward system of the present invention and a set of data structures utilized by the code. In one embodiment, the vehicle simulation competition code is embodied as an arcade game. A portion of the source code, written in "C", used to generate one embodiment of the executable code 106 is provided in the Appendix.

The CPU system 102 may communicate with the input/output system through a local bus, such as a 32-bit local bus that provides data communications between the processor and the input/output subsystem. Within the input/output subsystem is an I/O connector (not shown) that accepts inputs from peripheral devices or controls 110. In one embodiment, the I/O connector is a Japanese Amusement Machine Manufacturer's Association (JAMMA) connector. This type of connector is well-known in the art of arcade games and provides an interface for determining whether a peripheral event has occurred. For example, in many arcade games, a JAMMA connector is used to determine whether the start, fire, up, down, left or right buttons have been pressed by a player during a game play. Connected to the I/O connector may be a gas pedal, steering wheel, buttons, and so forth. Thus, when action is taken by a player, inputs into the CPU system 102 are activated.

In another embodiment, the CPU system 102, the memory 104, the I/O subsystem and the persistent storage 112 may be embodied as a personal computer, such as an IBM-compatible computer or a Macintosh computer from Apple. The personal computer may be connected to a computer network, e.g., the Internet, through an appropriate connection. In yet another embodiment, the CPU system 102, the memory 104, the I/O subsystem and the persistent storage 112 may be embodied in a dedicated game machine, such as available from Nintendo, Sega, Sony, or others.

Figure 2:
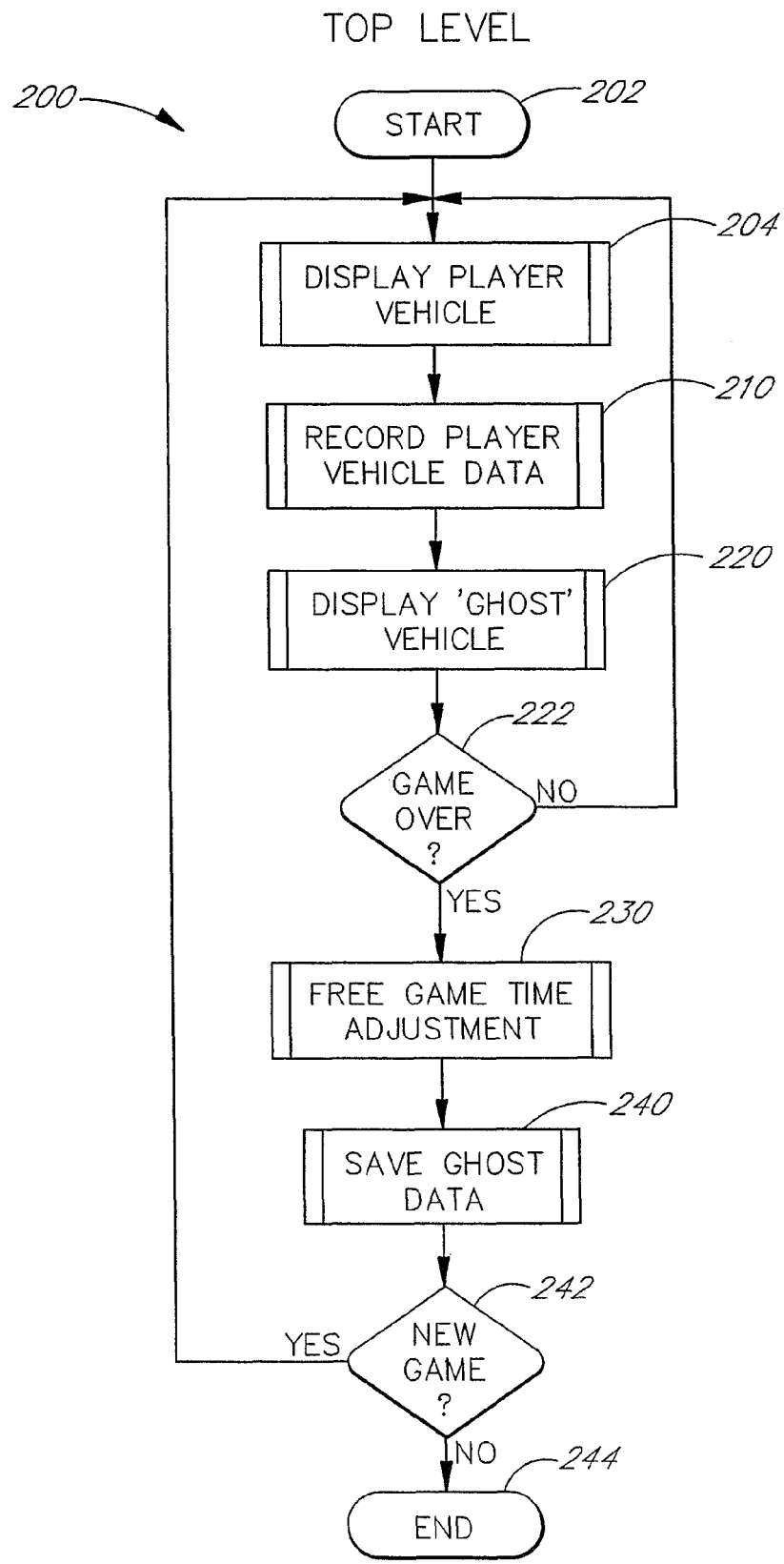
FIG. 2 is an operational flowchart describing using the system of FIG. 1 for simulated vehicle competition and determining a competition parameter for rewarding the player.

Referring to FIG. 2, a top level operational flowchart for a simulated vehicle competition process 200 will be described. Process 200 includes determining a competition parameter for rewarding a player. In one embodiment, the flowchart may describe a car racing arcade game embodied as the executable code 106 (FIG. 1). In another embodiment, the flowchart may describe a vehicle simulator or a video game embodied as the executable code 106. Although an arcade game embodiment is described hereinbelow, the description hereinafter also includes vehicle simulator or vehicle competition video game embodiments. Furthermore, the invention may be applied to non-vehicle competition, so long as there is objective criteria to determine when an award should be given. For example, the invention may be embodied in a sports, war, battle, adventure, or other environment, and the objective criteria may be resources remaining, points, treasures gained, or so forth.

Figure 9:
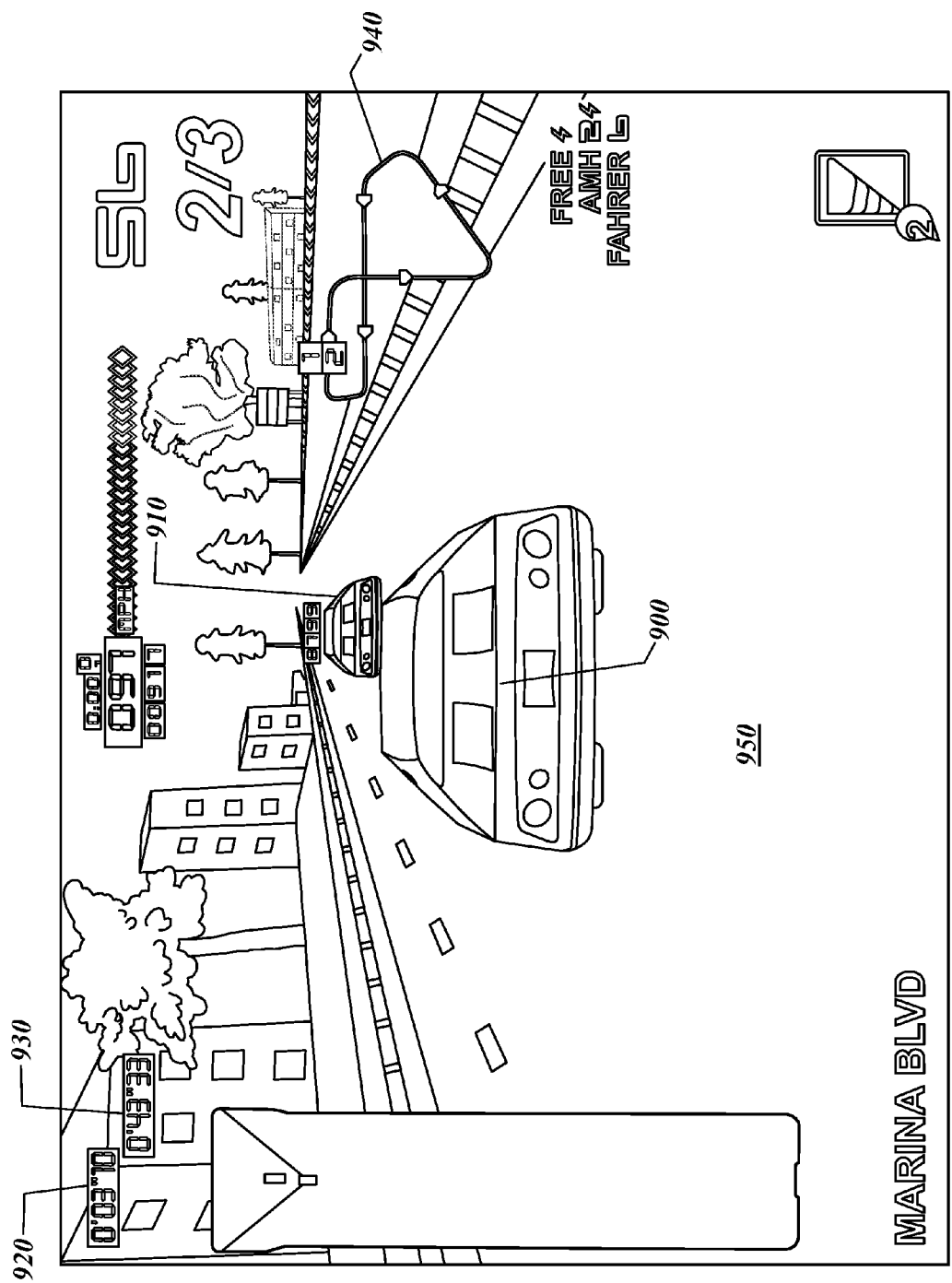
FIG. 9 is a diagram of a screen display for an exemplary scene of the vehicle competition system as seen on the display system of the embodiment shown in FIG. 1.

Beginning at a start state 202, process 200 begins a new vehicle competition game and moves to a Display Player Vehicle function 204. Function 204 displays a simulated vehicle, such as vehicle 900, being driven by a player on a track 950 of a simulated course 940 as shown in the exemplary screen shot of FIG. 9. The display of simulated vehicles on a simulated course is well known. For example, Applicant's U.S. Pat. Nos. 5,269,687 and 5,366,376 describe displaying a car on a track. A present race time 920 is also displayed, such as in a corner of the display.

At the completion of displaying the player's vehicle 900 at one point of time on the track 950, process 200 advances to a Record Player Vehicle Data function 210. Data regarding the position, orientation and time of the player's vehicle is stored in memory. Function 210 will be further described in conjunction with FIGS. 3A and 3B.

After the player vehicle data is stored for the instantaneous position of the player vehicle on the course, process 200 continues to a Display "Ghost" Vehicle function 220. In one embodiment, a "ghost" vehicle, such as ghost vehicle 910 (FIG. 9), is displayed as a lighter and translucent version of a player vehicle, although there are other ways of showing a ghost vehicle. The ghost vehicle may appear to be similar in size, color and shape, etc. to the player's vehicle, or may be different in size, color or shape, etc. The ghost vehicle may also be referred to as a phantom vehicle. In one embodiment, the word "FREE" may appear over the ghost vehicle as will be described hereinbelow.

After the ghost vehicle 910 is displayed at one point of time on the track 950, process 200 advances to a decision state 222 to determine if the present game has completed. If not, process 200 returns to function 204 to display the player vehicle at a subsequent time to the previous time of display. In one embodiment of the system 100, the loop of functions 204, 210 and 220 is performed about every 16 milliseconds or 60 times a second.

If the present game has completed, as determined at decision state 222, process 200 moves to a Free Game Time Adjustment function 230. In one embodiment of the present invention, a player receives a free game for beating the race finish time of the ghost car 910 (having "FREE" above it) as it traverses the course 940. The system 100 may include a plurality of courses or tracks, each of which may include a ghost car and a corresponding race finish time. The time to beat to win a free game may be adjusted to track a game operator's setting, for example, as will be explained in conjunction with FIGS. 5A, 5B, 6 and 7 hereinbelow.

After the free game time is adjusted by function 230, process 200 advances to a Save Ghost Data function 240. If the player beat the free game time, the system 100 stores new ghost vehicle data as will be described in conjunction with FIG. 8 below. At the completion of function 240, process 200 moves to a decision state 242 to determine if the player desires to play a new game. If so, process 200 moves to start a new game at function 204, as described above. If it is determined, at decision state 242, that a new game is not to be played, process 200 completes at an end state 244.

Figure 3A:
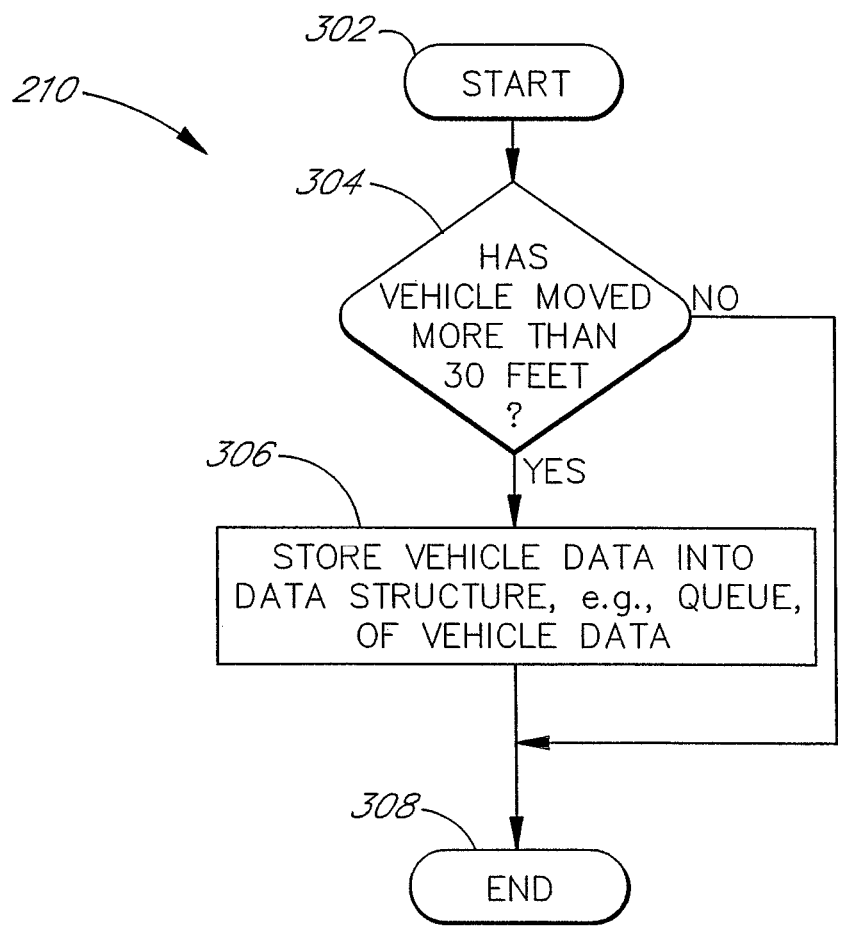
FIG. 3A is a flowchart describing one embodiment of the Record Player Vehicle Data function defined in FIG. 2.
Figure 3B:
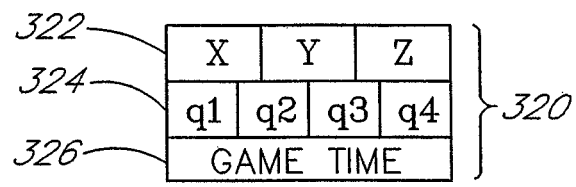
FIG. 3B is a diagram of one embodiment of a data record used in a data structure for storing player vehicle data.

Referring to FIGS. 3A and 3B, the Record Player Vehicle Data function 210, previously shown in FIG. 2, will be further described. Beginning at a start state 302, function 210 proceeds to a decision state 304 to determine if the player's vehicle has advanced a distance of 30 feet on the simulated course 940 (FIG. 9) since the last time player vehicle data was stored. In another embodiment, a distance other than 30 feet may be used, such as a distance selected from the range of 5 to 50 feet, for example. The selected distance value balances two opposing constraints. Using a short distance requires more memory to be used, and using too long a distance causes an undesirable effect to occur, i.e., there may be artifacts in the animation when played back or reproduced. In one embodiment, the distance value may be based on the size of the available memory. In another embodiment, advanced techniques may lower the memory usage and may be used on a less powerful system, such as a home gaming system, for example. Player vehicle data is stored at the beginning of the course as initial stored data. If the vehicle has not moved more than 30 feet, as determined at decision state 304, function 210 completes and proceeds to end state 308.

Figure 3C:
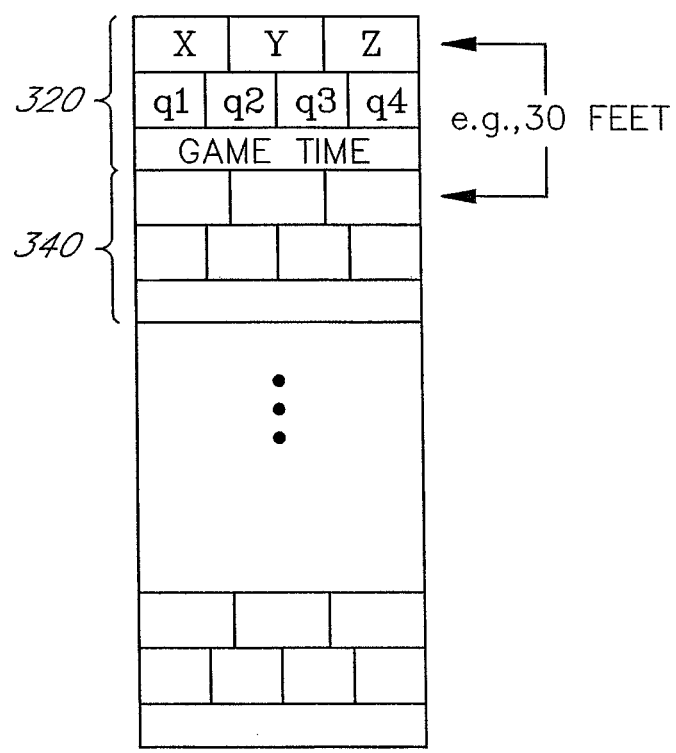
FIG. 3C is a diagram of one embodiment of a data structure for storing player vehicle data as described in FIG. 3A.

If the vehicle has moved more than 30 feet, as determined at decision state 304, function 210 proceeds to state 306. At state 306, the present vehicle data is stored in a vehicle data structure, which functions as a present course buffer. For example, data regarding the position, orientation and game time of the player's vehicle is stored in the data structure 108 in memory 104. An exemplary queue data structure 330 having multiple data records, such as data records 320 and 340, is shown in FIG. 3C. In one embodiment, the data record 320 (also for record 340 and subsequent records) has fields 322 for vehicle X, Y, Z position, fields 324 for quaternion q1, q2, q3, q4 orientation, and a game time field 326, and is shown in FIG. 3B. Quaternion orientation may be implemented by computer functions such as described in *Advanced Animation and Rendering Techniques, Theory and Practice*, Alan Watt and Mark Watt, Addison Wesley, Menlo Park, Calif., ISBN 0-201-54412-1, pages 361-368, which is hereby incorporated by reference. Data for an exemplary record is as follows:

| | |
|---|---|
| X: | 3354.7895 |
| Y: | 4521.8561 |
| Z: | 30.5435 |
| q1: | 0.7071 |
| q2: | 0.5000 |
| q3: | 0.0000 |
| q2: | 0.5000 |
| game time: | 32043 (units in milliseconds) |

A new record with data corresponding to a distance of 30 feet down the track is stored at location 340 of the structure 330 in a subsequent execution of function 210. After the completion of state 306, function 210 completes at an end state 308.

Figure 4:
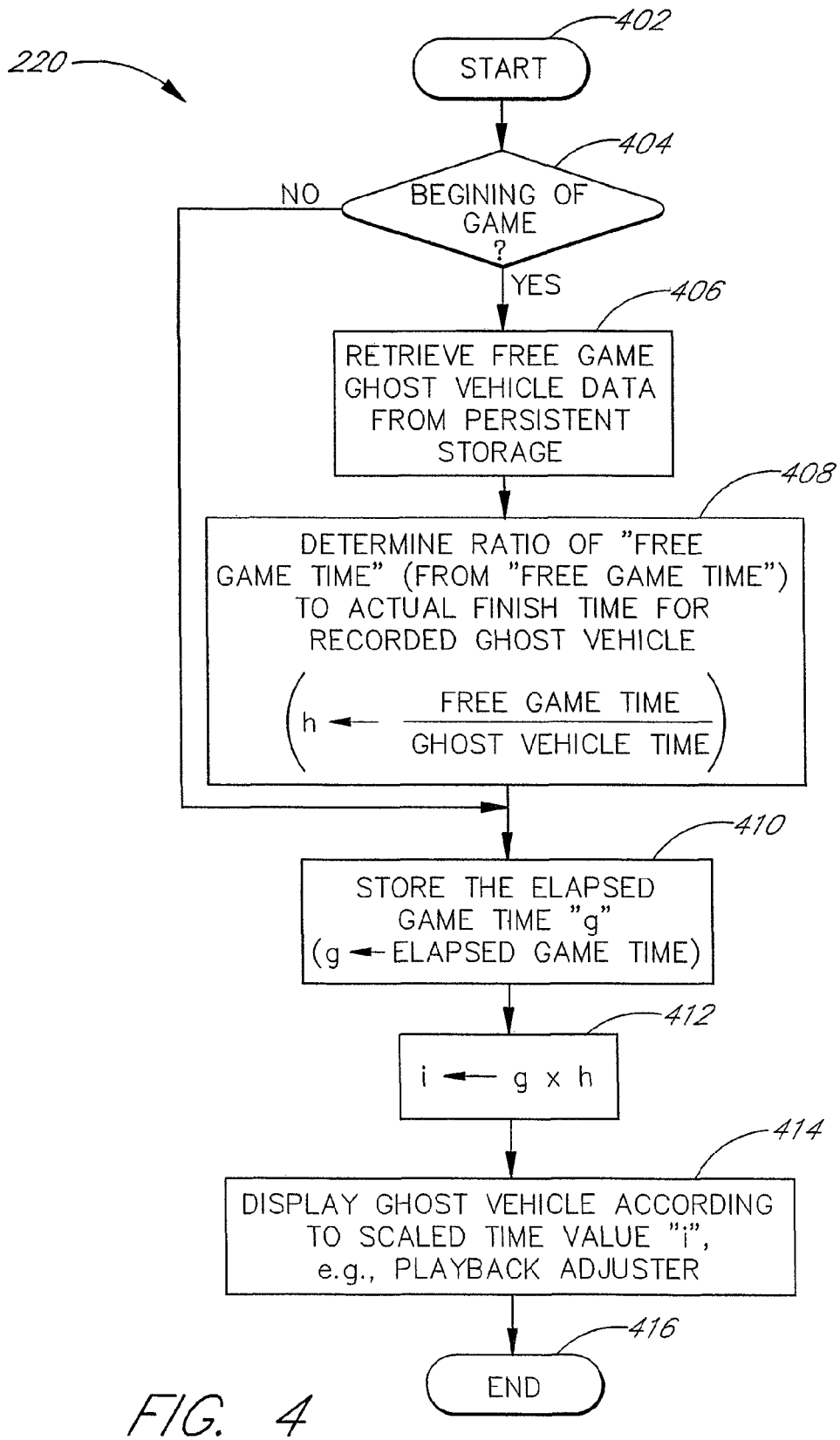
FIG. 4 is a flowchart describing one embodiment of the Display Ghost Vehicle function defined in FIG. 2.

Referring to FIG. 4, the Display Ghost Vehicle function 220, previously shown in FIG. 2, will be further described. Beginning at a start state 402, function 220 proceeds to a decision state 404 to determine if this execution of the function 220 is at the beginning of the game. If so, process 220 retrieves ghost vehicle path data, such as stored in a queue data structure 330 (FIG. 3B) by function 240, from persistent storage 112 (FIG. 1) at state 406. However, if the ghost vehicle path data has already been previously retrieved, as determined at decision state 404, function 220 proceeds to state 408. At state 408, function 220 determines a ratio of the race time needed to win a free game ("free game time"), which is obtained from a Free Game Time function 620 (FIGS. 6 and 7) that is part of the Free Game Time Adjustment function 230, to the actual finish time for the stored ghost vehicle ("ghost vehicle time"). This ratio is used to set a variable "h". For example, if a free game time was 210,453 milliseconds and a ghost vehicle time was 212,341 milliseconds, the ratio "h" of free game time to ghost vehicle time would be 0.99110864.

Moving to state 410, function 220 sets a variable "g" equal to the elapsed game time. An exemplary elapsed game time may be 32,043 milliseconds. Continuing at state 412, function 220 multiplies the value of variable "g" and the value of variable "h" and sets the product equal to the variable "i". Using the above exemplary values, "i" may be 31,758. Moving to state 414, function 220 displays the ghost vehicle according to the scaled time value "i". The software code for state 414 operating on the CPU system 102 functions as a playback adjuster in one embodiment. Showing the position and orientation of a recorded path in three-dimensions along with an orientation using quaternions and a rendered three-dimensional object are discussed in *Advanced Animation and Rendering Techniques, Theory and Practice*, mentioned above. State 414 uses the scaled time value "i" to reference as an index into the time-ordered animation data, e.g., ghost vehicle data. Then, known techniques, such as determining a weighted average of two samples based on a linear proximity in time between sample time values, ibid., are used in the display of the ghost vehicle. Therefore, in one embodiment, a single animation may be played at different speeds based on the scaling ratio "h". For example, referring to FIG. 3C, the scaled time value "i" may lie between the game time of data record 320 and the game time of data record 340. In one embodiment, an interpolation is done to calculate new X, Y, Z, q1, q2, q3 and q4 values based on the proximity in time of the scaled time value "i" between the game times of the two data records. Function 220 completes at an end state 416.

Figure 5A:
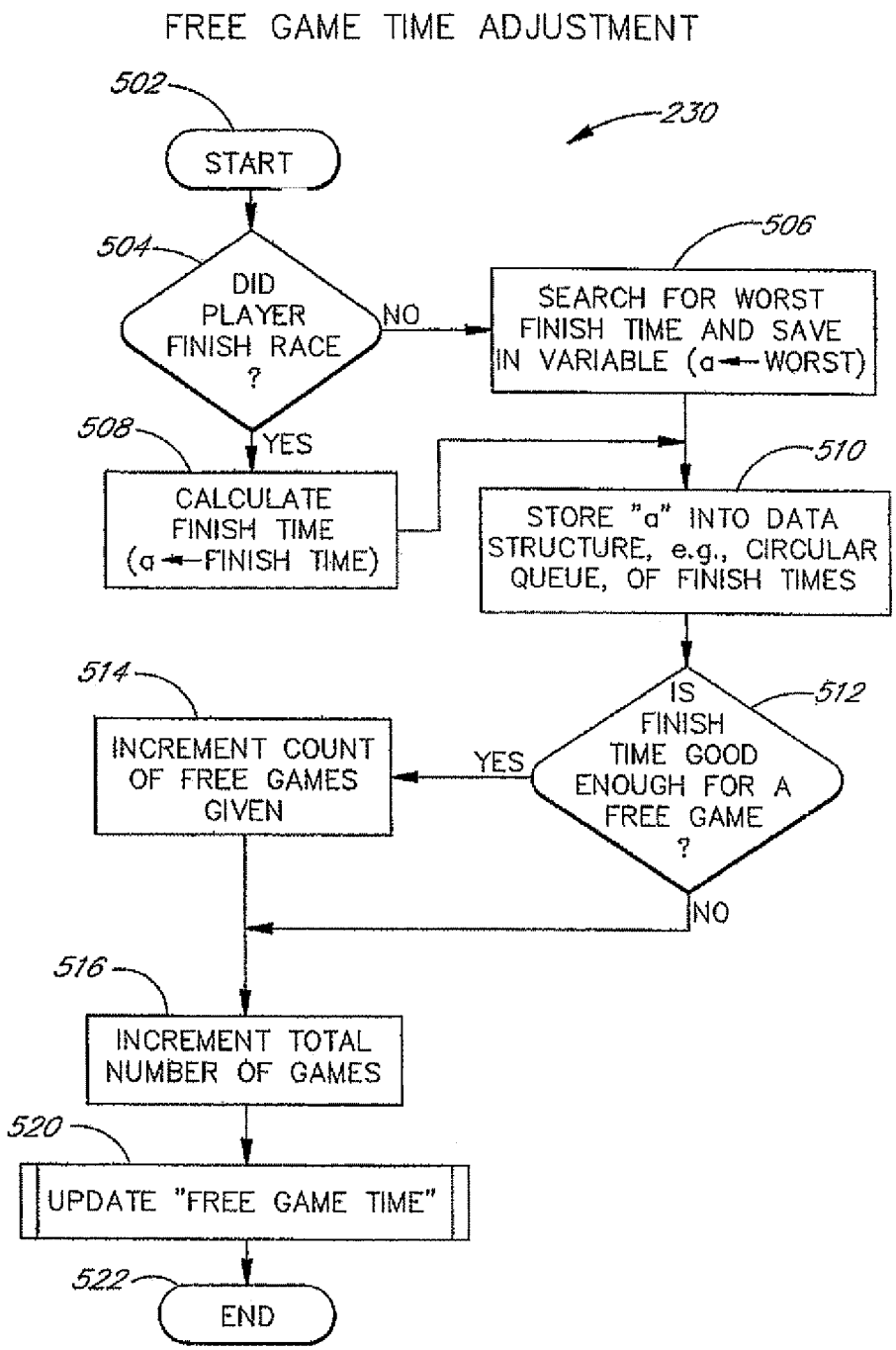
FIG. 5A is a flowchart describing one embodiment of the Free Game Time Adjustment function defined in FIG. 2.
Figure 5B:
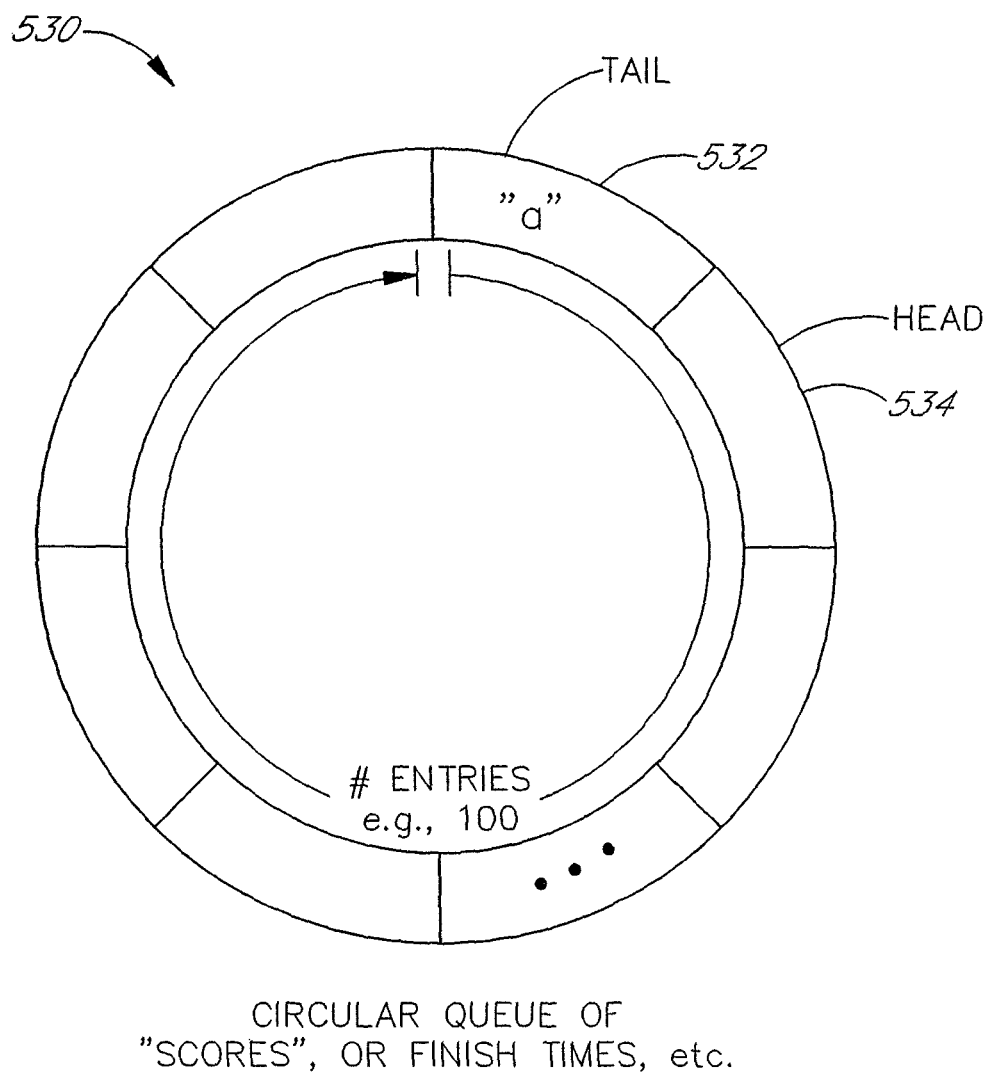
FIG. 5B is a diagram of one embodiment of a data structure for storing competition data as described in FIG. 5A.

Referring to FIGS. 5A and 5B, the Free Game Time Adjustment function 230, previously shown in FIG. 2, will be further described. In one embodiment, function 230 is performed after completion of a game, i.e., after the present game ends but before another game may begin. Portions of the software code and the CPU system 102 (FIG. 1) function as a parameter adjuster.

Beginning at a start state 502, function 230 proceeds to a decision state 504 to determine if the player's vehicle finished the present race. If not, function 230 moves to state 506 and searches for the worst value of the competition parameter, such as slowest time, in a data structure 530 containing one or more competition parameters, such as race finish times. The worst finish time is set to a variable "a". In one embodiment, the data structure 530 may be a circular queue of race finish times, scores, etc. The circular queue 530 is one of the data structures 108 (FIG. 1). In one embodiment, the circular queue 530 contains one hundred entries. In another embodiment, the circular queue 530 may have a number of entries that is greater or less than one hundred.

Returning to decision state 504, if the player did finish the race, function 230 proceeds to state 508 and sets the variable "a" to the finish time for the race. At the completion of either state 508 or state 506, function 230 advances to state 510. At state 510, function 230 stores variable "a" into a data structure, such as the circular queue 530. Referring to FIG. 5B, the slot in the circular queue which just receives an entry, such as the variable "a", is referred to as the tail 532 of the queue. The location just in front of the tail is referred to as the head 534 of the queue.

At the completion of state 510, function 230 proceed to a decision state 512 to determine if the finish time is good enough for a free game. This may happen if the player's vehicle beats the ghost car across the finish line for the course. If so, function 230 continues at state 514 and increments a count of free games awarded by the game system 100. At the completion of state 514, or if the finish time was not good enough for a free game, as determined at decision state 512, function 230 proceeds to state 516. At state 516, function 230 increments a total number of game played on the system 100. Function 230 then proceeds to an Update Free Game Time function 520 which is described below. At the completion of function 520, function 230 completes at an end state 522.

Figure 6:
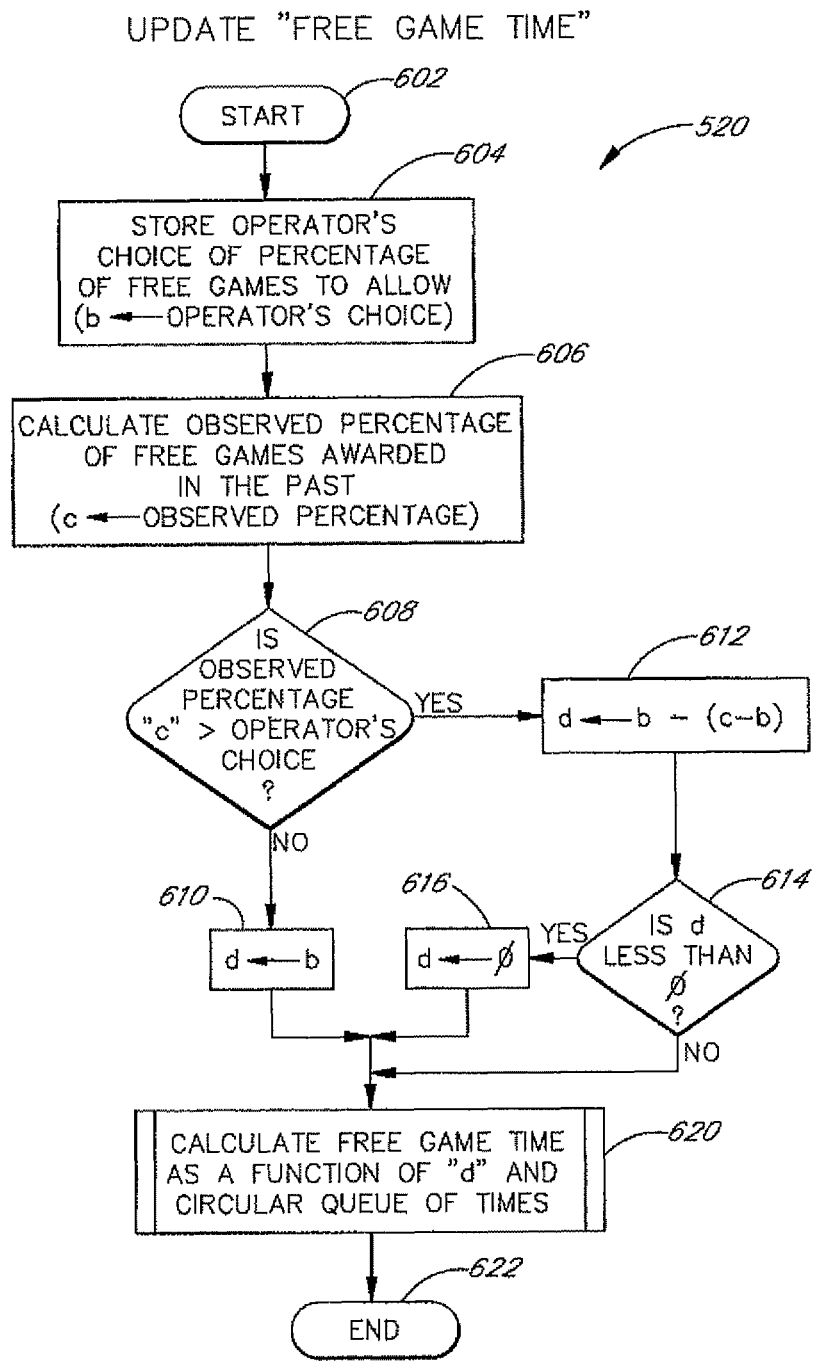
FIG. 6 is a flowchart describing one embodiment of the Update Time to Beat function defined in FIG. 5A.

Referring to FIG. 6, the Update Free Game Time function 520, previously shown in FIG. 5a will be further described. Beginning at a start state 602, function 520 proceeds to state 604 where a percentage of free games to allow for the game system 100 is used to set a variable "b". In one embodiment, the values for "b" may be 5%, 10% or 15% free games. The percentage of free games to allow has previously been selected by the operator, owner or administrator of the system 100. In another embodiment, the percentage of free games to allow may be initially set by the manufacturer, i.e., the factory. Variable "b" is referred to as the operator's choice percentage.

Moving to state 606, an observed percentage based on a number of free games awarded for previously played games and a total number of previously played games, which are tracked by the game system 100, is used to set a variable "c". This variable is referred to as the observed percentage. Continuing to a decision state 608, function 520 determines if the observed percentage is greater that the operator's choice percentage. If not, function 520 sets the value of variable "b" to a variable "d" at state 610. However, if the observed percentage of free games is greater than the operator's choice percentage, as determined at decision state 608, function 520 proceeds to state 612. At state 612, function 520 calculates a value for variable "d" by subtracting the value of variable "b" from the value of variable "c" and taking that result and subtracting it from the value of variable "b". This result is used to set the variable "d". For example, for the exemplary values of "b"=5% and "c"=5.1%, "d" would be (b−(c−b))=4.9%.

Advancing to a decision state 614, function 520 determines if the value of the variable "d" is less than zero. If so, function 520 proceeds to state 616 and sets the variable "d" to be equal to zero. In one embodiment, the effect of setting "d" to zero forces the Calculate Free Game Time function 620 (FIG. 7) to return the fastest time in the circular queue 530 as the new free game time (time to beat), as is discussed below. At the completion of state 610 or state 616, or if the value of variable "d" is not less than zero, as determined at decision state 614, function 520 proceeds to function 620. Function 620 calculates a free game time as a function of the variable "d" and of the circular queue of times 530. Function 620 will be described below in conjunction with FIG. 7. Note that the free game time is shown on the exemplary screen shot of FIG. 9 as the Free Game Time 930. At the completion of function 620, function 520 finishes at an end state 622.

Of course, other techniques could be used to update the free game time, especially when it is determined that statistical game times deviate from the intended level of awarding free games.

Figure 7:
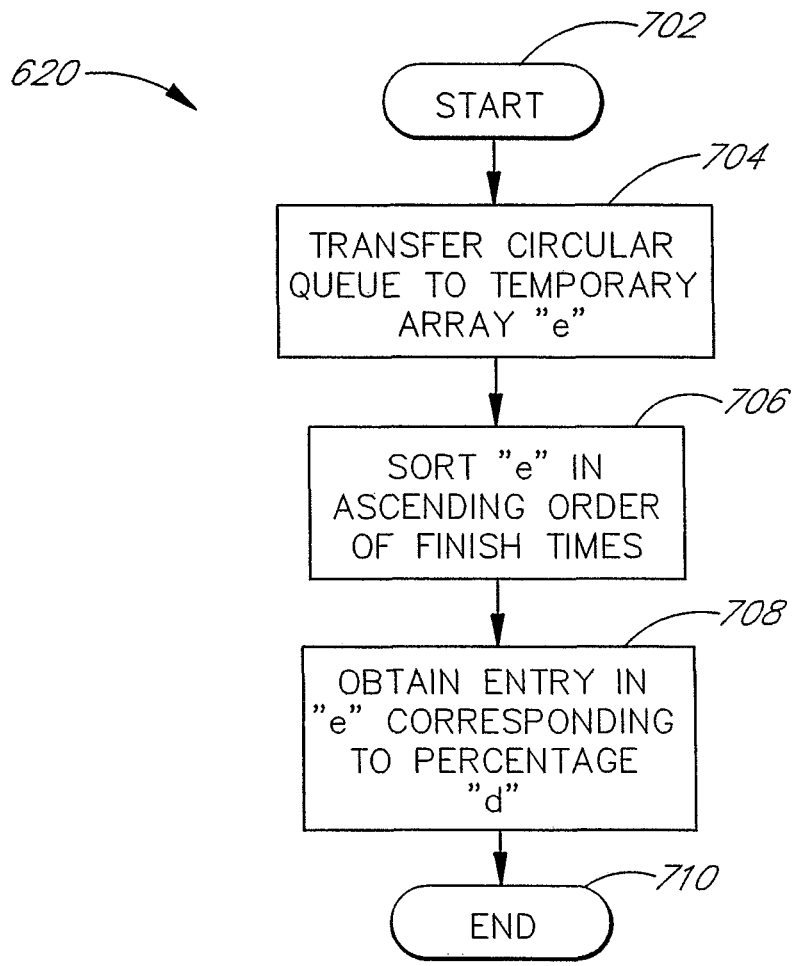
FIG. 7 is a flowchart describing one embodiment of the Calculate Time to Beat function defined in FIG. 6.

Referring to FIG. 7, the Calculate Free Game Time function 620, previously shown in FIG. 6, will be further described. Beginning at a start state 702, function 620 proceeds to state 704. At state 704, function 620 transfers the values of the circular queue 530 to a temporary array "e". If the queue is not full, the values are transferred into the top of the array. Advancing to state 706, function 620 sorts temporary array "e" in ascending order of the competition parameter, which may be the race finish times. In one embodiment, this state yields an array of one hundred locations with the fastest finish time stored in location zero and the slowest finish time stored in location 99. Moving to state 708, function 620 obtains an entry in temporary array "e" corresponding to the percentage variable "d". In operation, since the circular queue 530 and thus temporary array "e", may not always be full, an interpolation between existing elements in the queue may be done. Note that interpolation may also be done on a full array. Also note that if the percentage variable "d" is fractional, multiple entries may be used for interpolation to obtain a more precise value.

For example, the value of "d" may be 4.9% and the sorted temporary array "e" may have the following ten values:

| element | value |
| --- | --- |
| 0: | 230747 |
| 1: | 231001 |
| 2: | 231567 |
| 3: | 231588 |
| 4: | 231666 |
| 5: | 232189 |
| 6: | 234438 |
| 7: | 237069 |
| 8: | 239421 |
| 9: | 241597 |

In one embodiment, the determination of the free game time may be done as follows: First, a fractional number representing the index of the number or numbers to use and a fractional interpolation value to use to interpolate between two numbers is determined using the following equation:

"d"(in percentage)*<number of elements in array"e">/100%.

For the value of "d"=4.9%, and the number of elements in array "e"=10:

4.9%*10(total entries in list)/100%=49/100=0.49

The index of the first element to use is the integer part of 0.49 (which is 0) and the fractional part is used to interpolate between elements 0 and 1. Therefore, the free game time would be:

e[0]+(e[1]−e[0])*frac 230747+(231001−230747)*0.49=230747+(254)*0.49=230747+124.46=230871 milliseconds, or 3'40"871 (3 minutes, 50 seconds, and 871 milliseconds)

At the completion of state 708, function 620 completes at an end state 710.

Figure 8:
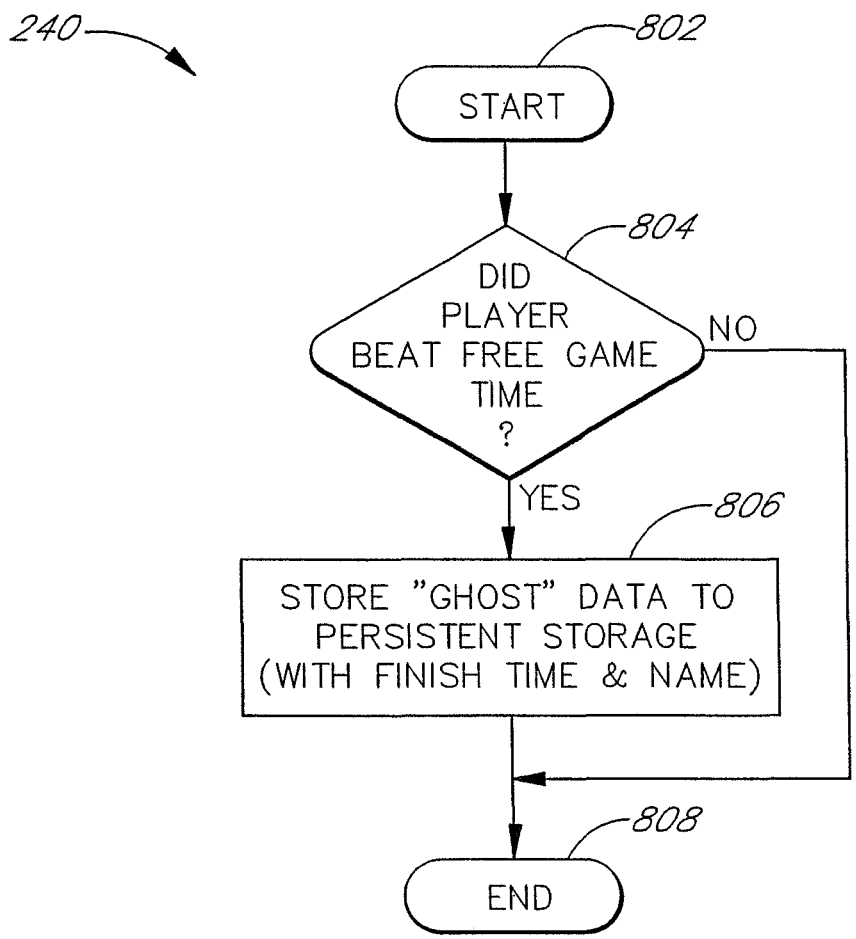
FIG. 8 is a flowchart describing one embodiment of the Save Ghost Data function defined in FIG. 2.

Referring to FIG. 8, the Save Ghost Data function 240, previously shown in FIG. 2, will be further described. Beginning at a start state 802, function 240 proceeds to a decision state 804 to determine if the player beat the free game time for the present race. If not, function 240 completes and proceeds to an end state 808. However, if the player did beat the free game time, as determined at decision state 804, function 240 moves to state 806. At state 806, function 240 stores the ghost data, which was temporarily stored to a buffer queue in function 210, to the persistent storage 112, which in one embodiment, functions as a recorded course storage. The buffer data, which is from the queue data structure 330, is supplemented with the race finish time for the course and the name of the player that traversed the course. At the completion of state 806, the function 240 proceeds to an end state 808.

The example discussed above relates to a game wherein the parameter that is compared is time, and the reward is a free game. Other embodiments, such as a simulator, may use different parameters for comparison, such as a count of accidents, a score, etc., and other types of rewards. For example, the competition system may be connected to a global computer network and the reward may comprise recognition for the player on a network resource of the global computer network. As another example, the competition system may be connected to a global computer network and the reward may comprise cyber-credits or a cyber-reward for the player on the global computer network.

In another embodiment, the competition system may be connected to a global computer network and the vehicle race (ghost) data may be transmitted to a network resource. The vehicle race data for a particular player may be compiled with the vehicle race data of other players. Players who access the network resource may be able to download the vehicle race data to use as ghost data in their competition system.

Specific blocks, sections, devices, functions and modules may have been set forth. However, a skilled technologist will realize that there are many ways to partition the system of the present invention, and that there are many parts, components, modules or functions that may be substituted for those listed above.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

1. Appendix

```
/*
 * ================================================================
 *
 * $RCSfile: freeg.c,v $ --
 *
 * Copyright (C)1999 Atari Games
 * Unauthorized reproduction, adaptation, distribution, performance or
 * display of this computer program or the associated audiovisual work
 * is strictly prohibited.
 *
 * ================================================================
 * $Author: hightower $      $Date: 1999/07/13 05:16:38 $
 * $Revision: 1.4 $      $Locker: $
 * ================================================================
 */
#include "freeg.h"
#include "hi.h"
#include "cksum.h"
#include "game.h"
#include "defines.h"
#include <string.h>
#include <stdlib.h>
#include <stdio.h>
#define FG_FILEVERSION 1
/*
 * NOTE: this modules uses PLAYERS/team.rwm even though it should have it's
 *    file named something like "FREEGAME/game_history.rwm"
 *    Apologies in advance for any confusion.. (AMH)
 */
#define CONVERT(time,laps)   (((time)*3)/(laps))
#define UNCONVERT(time,laps) (((time)*laps)/(3))
static BOOL fg_read;
typedef struct _fgTrackHist
{
   /* head==tail -> empty
    * head==tail+1 -> 1 item in list at samp[tail]
    * head==tail-1 -> list full
    *
    * head >= FG_MAXSAMPS -> undefined ..not allowed
    * tail >= FG_MAXSAMPS -> undefined ..not allowed
    */
   S32 head;
   S32 tail;
   S32 samps[FG_MAXSAMPS];
   S32 curttb;
   U32 totalgames; /* Count of free games */
   U32 freegames; /* total game count */
}
fgTrackHist;
typedef struct _fgDb
{
   fgTrackHist h[FG_MAXTRACKS][FG_MODES];
}
fgDb;
static void
_insert( fgTrackHist *h, S32 val )
{
   h->samps[h->head++] = val;
   if( h->head >= FG_MAXSAMPS ) h->head = 0;
   if( h->head == h->tail )
   {
      h->tail++;
      if( h->tail >= FG_MAXSAMPS ) h->tail = 0;
   }
}
static fgDb fg;
static S32 _fgTime2Beat( S32 track, S32 mode, S32 percent );
static void _fgRead( void );
```

```
/* Race time in units of milliseconds per 3-laps */
static S32 ttb[FG_MAXTRACKS][FG_MODES] =
{
    { 140000, 130000 }, /* T1 */
    { 193000, 190000 }, /* T2 */
    { 193000, 190000 }, /* T3 */
    { 194000, 190000 }, /* T4 */
    { 265000, 260000 }, /* T5 */
};
void
fgInit( void )
{
    _fgRead( );
}
static void
_fgUpdateTimes( void )
{
    F32 ratio;
    S32 i,j;
    for( i=0; i<FG_MAXTRACKS; i++ )
    {
        for( j=0; j<FG_MODES; j++ )
        {
            S32 val;
            fgTrackHist *h;
            h = &fg.h[i][j];
            ratio = gDstWinRatio;
            if( h->totalgames )
            {
                F32 oratio; /* observed ratio */
                oratio = 100.0f * h->freegames / h->totalgames;
                if( oratio > ratio )
                {
                    ratio = ratio − ( oratio − ratio );
                    if( ratio < 0 ) ratio = 0;
                }
            }
            val = _fgTime2Beat( i, j, ratio );
            if( val ) h->curttb = val;
            else
            {
                h->tail = 0;
                h->head = 1;
                h->samps[0] = h->curttb = ttb[i][j];
            }
        }
    }
}
static S32
_fgWorst( S32 tidx, S32 midx )
{
    fgTrackHist *t;
    S32 i;
    S32 worst;
    t = &fg.h[tidx][midx];
    if( t->tail == t->head ) return ttb[tidx][midx];
    worst = t->samps[t->tail];
    for( i=t->tail; i!=t->head; i=((i+1)%FG_MAXSAMPS) )
    {
        if( t->samps[i] > worst ) worst = t->samps[i];
    }
    return worst;
}
/*
 * Return the percent of finish times that are better than the given time
 */
S32
_fgPercent( S32 track, S32 mode, S32 time, S32 laps )
{
    fgTrackHist *t;
    S32 better = 0;
    S32 total = 0;
    S32 i;
    S32 val = CONVERT(time,laps);
    t = &fg.h[track][mode];
    for( i=t->tail; i!=t->head; i=((i+1)%FG_MAXSAMPS) )
    {
        if( t->samps[i] < val ) better++;
        total++;
```

```
   }
   return ( total == 0 ) ? 0 : ( better * 100 ) / total;
}
static int
comparS32( const void *_a, const void *_b )
{
   S32 *a = ( S32 * ) _a;
   S32 *b = ( S32 * ) _b;
   return *a - *b; /* Sort in ascending order */
}
S32
_fgTime2Beat( S32 track, S32 mode, S32 percent )
{
   S32 i;
   S32 total = 0;
   S32 tmp[FG_MAXSAMPS] = {0};
   F32 fidx;
   F32 frac;
   fgTrackHist *t;
   if( percent > 100 ) percent = 100;
   if( percent < 0 ) percent = 0;
   t = &fg.h[track][mode];
   for( i=t->tail; i!=t->head; i=((i+1)%FG_MAXSAMPS) )
   {
      tmp[total++] = t->samps[i];
   }
   qsort( tmp, total, sizeof( S32 ), comparS32 );
   if( total > 0 )
   {
      fidx = ( (F32)percent * (F32)total ) / ( 100.0f );
      if( fidx >= total ) fidx = total - 1;
   }
   else fidx = 0;
   i = (S32)fidx;
   frac = fidx - (F32)i;
   if( i+1 < total )
   {
      return tmp[i] + ( tmp[i+1] - tmp[i] ) * ( frac );
   }
   else
   {
      return tmp[i];
   }
}
BOOL
fgEarned( S32 track, S32 mode, S32 time, S32 laps )
{
   BOOL earned;
   fgTrackHist *h;
   if( !fg_read ) _fgRead( );
   if( !gDstWinRatio ) return 0;
   if( !laps ) return 0;
   if( track < 0 || track >= FG_MAXTRACKS ) return 0;
   if( mode < 0 || mode > FG_MODES ) return 0;
   if( !time ) return 0;
   h = &fg.h[track][mode];
   earned = ( CONVERT(time,laps) < h->curttb );
   return earned;
}
static void
_fgWrite( void )
{
   FILE *f;
   ckSum ck;
   S32 ver = FG_FILEVERSION;
   if( ( f = fopen( "/d0/PLAYERS/teams.rwm", "r+" ) ) )
   {
      ck = ckSumGet( &fg, sizeof( fg ) );
      fwrite( &ver, sizeof( ver ), 1, f );
      fwrite( &ck, sizeof( ck ), 1, f );
      fwrite( &fg, sizeof( fg ), 1, f );
      fclose( f );
   }
}
static void
_fgRead( void )
{
   FILE *f;
   ckSum ck1;
```

```
  ckSum ck2;
  S32 ver = FG_FILEVERSION;
  if( fg_read ) return;
  bzero( ( void * ) &fg, sizeof( fg ) );
  if( ( f = fopen( "/d0/PLAYERS/teams.rwm", "r" ) ) )
  {
    fread( &ver, sizeof( ver ), 1, f );
    if( ver == FG_FILEVERSION )
    {
      fread( &ck1, sizeof( ck1 ), 1, f );
      fread( &fg, sizeof( fg ), 1, f );
    }
    fclose( f );
  }
  ck2 = ckSumGet( &fg, sizeof( fg ) );
  if( !ckSumEqual( ck1, ck2 ) )
  {
    bzero( ( void * ) &fg, sizeof( fg ) );
  }
  _fgUpdateTimes( );
  fg_read = 1;
}
/*
 * Submit a race time for entry in the database for determining the
 * race time to beat
 */
void
fgSubmit( S32 track, S32 mode, S32 time, S32 laps )
{
  BOOL earned;
  fgTrackHist *h;
  h = &fg.h[track][mode];
  if( !laps ) return;
  if( track < 0 || track >= FG_MAXTRACKS ) return;
  if( mode < 0 || mode > FG_MODES ) return;
  h = &fg.h[track][mode];
  /* NOTE: if they don't finish the race, make it easier */
  if( !time )
  {
    _insert( h, _fgWorst(track,mode) );
  }
  else
  {
    _insert( h, CONVERT(time,laps) );
  }
  earned = fgEarned( track, mode, time, laps );
  h->totalgames++;
  h->freegames += earned;
  if( h->totalgames >= 0xffffffff )
  {
    h->totalgames /= 2;
    h->freegames /= 2;
  }
  _fgUpdateTimes( );
  _fgWrite( );
}
S32
fgTime2Beat( S32 track, S32 mode, S32 laps )
{
  S32 t;
  if( !laps ) return;
  if( track < 0 || track >= FG_MAXTRACKS ) return;
  if( mode < 0 || mode> FG_MODES ) return;
  t = fg.h[track][mode].curttb;
  t = UNCONVERT(t,laps);
  return t;
}
```

What is claimed is:

1. A computerized competition method, comprising:

accumulating a plurality of competition scores in a computer memory from multiple competitions in a competition environment implemented using at least one computer, wherein the plurality of competition scores are retained from among the multiple competitions using a processor in communication with the memory;

determining a variable observed percentage based on a number of awards won from the multiple competitions and a total number of the multiple competitions, using the processor; and selecting, using the processor, one of the competition scores to be a threshold for further competitions in the competition environment, wherein passing the threshold determines an award, and wherein the selecting is based on a parameter determined by: (a) if a predefined percentage of awards is not greater than a current value of the variable observed percentage, then setting the parameter equal to the predefined percentage of awards, and (b) if the current value of the variable observed percentage is greater than the predefined percentage of awards, then setting the parameter equal to the greater of: zero or a difference based on the predefined percentage of awards and the current value of the variable observed percentage.

2. The method of claim 1, wherein the difference is determined by twice the predefined percentage of awards minus the current value of the variable observed percentage.

3. The method of claim 1, wherein the selecting comprises:
sorting the plurality of accumulated competition scores into a sequential order; and
selecting a competition score from the sorted plurality of accumulated competition scores at an index determined by parameter applied as a factor to a total number of accumulated competition scores.

4. The method of claim 1, wherein the threshold is a free game time in a driving competition.

5. The method of claim 1, additionally comprising adjusting the threshold based on a subsequent competition score that passes the threshold, thereby using the subsequent competition score to generate a new threshold.

6. The method of claim 1, additionally comprising sorting the plurality of accumulated competition scores according to a predetermined criterion.

7. The method of claim 1, wherein each of the plurality of accumulated competition scores comprises a time to finish a race.

8. The method of claim 1, additionally comprising awarding a present player of the computerized competition a reward if the most recent competition score passes the threshold.

9. The method of claim 8, wherein the computerized competition operates on a global computer network and the reward comprises recognition for the present player on a network resource of the global computer network.

10. The method of claim 8, wherein the computerized competition operates on a global computer network and the reward comprises cyber-credits or a cyber-reward for the player on the global computer network.

11. The method of claim 1, additionally comprising:
tagging each of the plurality of accumulated competition scores with a date of storage and a time of storage; and
removing the competition score tagged with the oldest date and time when a new competition score is available for storing.

12. The method of claim 1, further comprising modifying the threshold over time.

13. A computerized competition system, comprising:
means for accumulating a plurality of competition scores from multiple competitions in a competition environment;
means for determining a variable observed percentage based on a number of awards won from the multiple competitions and a total number of the multiple competitions; and
means for selecting one of the competition scores to be a threshold for further competitions, wherein passing the threshold determines an award, and wherein the means for selecting determines which competition score to select as a function of a parameter determined by: (a) if a predefined percentage of awards is not greater than a current value of the variable observed percentage, then the parameter is set equal to the predefined percentage of awards, and (b) if the current value of the variable observed percentage is greater than the predefined percentage of awards, then the parameter is set equal to the greater of: zero or a difference based on the predefined percentage of awards and the current value of the variable observed percentage.

14. The system of claim 13, wherein the means for selecting comprises:
means for sorting the plurality of accumulated competition scores into a sequential order; and
means for selecting a competition score from the sorted plurality of accumulated competition scores at an index determined by the parameter applied as a factor to a total number of accumulated competition scores.

15. The system of claim 13, additionally comprising means for adjusting the threshold based on a subsequent competition score that passes the threshold, thereby using the subsequent competition score to generate a new threshold.

16. The system of claim 13, additionally comprising means for awarding a present player of the computerized competition a reward if the most recent competition score passes the threshold.

17. A non-transitory computer-readable medium holding program code, that when executed by a computer, causes a computer to:
accumulate a plurality of competition scores from multiple competitions in a competition environment;
determine a variable observed percentage based on a number of awards won from the multiple competitions and a total number of the multiple competitions; and
select one of the competition scores to be an award threshold for further competitions based on a function of a parameter determined by: (a) if a predefined percentage of awards is not greater than a current value of the variable observed percentage, then the parameter is set equal to the predefined percentage of awards, and (b) if the current value of the variable observed percentage is greater than the predefined percentage of awards, then the parameter is set equal to the greater of: zero or a difference based on the predefined percentage of awards and the current value of the variable observed percentage.

18. The non-transitory computer-readable medium of claim 17, further holding program code for:
sorting the plurality of accumulated competition scores into a sequential order; and
selecting a competition score from the sorted plurality of accumulated competition scores at an index determined by the function applied to a total number of accumulated competition scores.

19. The non-transitory computer-readable medium of claim 17, further holding program code for comprising adjusting the award threshold based on a subsequent competition score that passes the threshold, thereby using the subsequent competition score to generate a new threshold.

20. The non-transitory computer-readable medium of claim 17, further holding program code for awarding a present player of the computerized competition a reward in response to a most recent competition score passing the award threshold.

* * * * *